M. HANDSCHIEGL.
PROCESS OF PRODUCING COLORED MOVING PICTURE FILMS.
APPLICATION FILED APR. 9, 1918.
1,316,791. Patented Sept. 23, 1919.
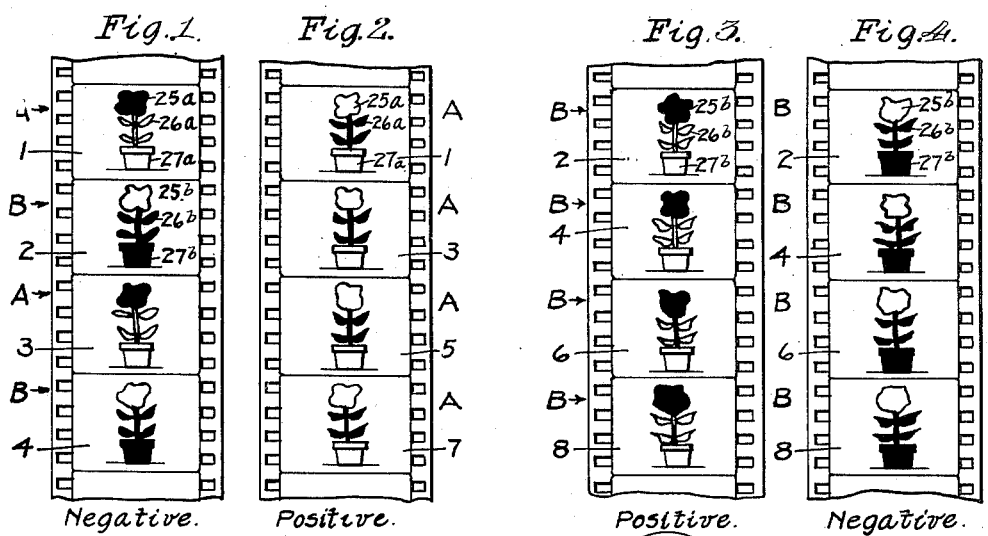
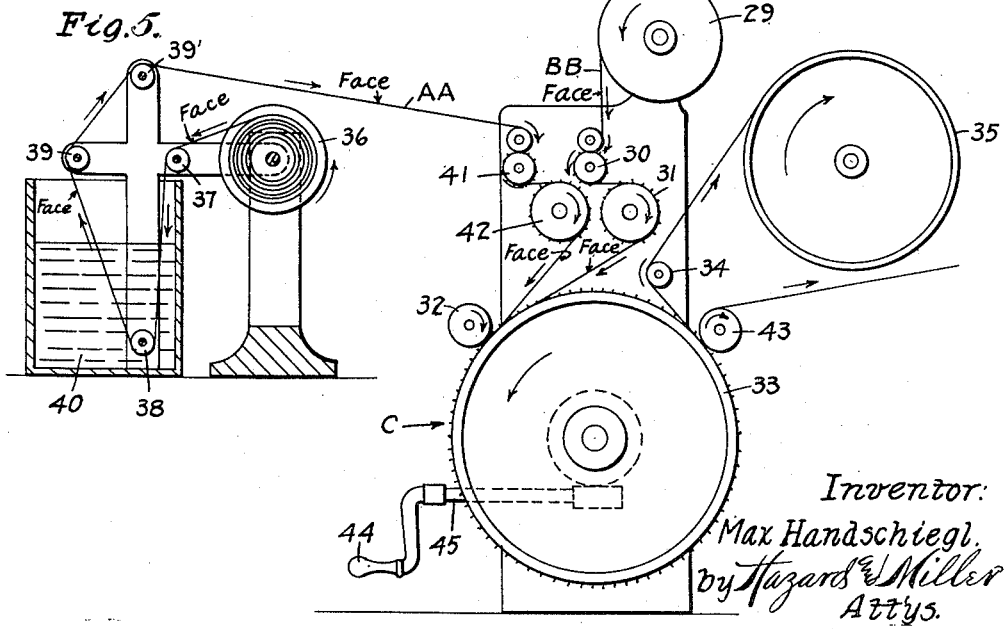

UNITED STATES PATENT OFFICE.

MAX HANDSCHIEGL, OF LOS ANGELES, CALIFORNIA.

PROCESS OF PRODUCING COLORED MOVING-PICTURE FILMS.

1,316,791.

Specification of Letters Patent.

Patented Sept. 23, 1919.

Application filed April 9, 1918. Serial No. 227,580.

*To all whom it may concern:*

Be it known that I, MAX HANDSCHIEGL, a citizen of the United States, residing at Los Angeles, in the county of Los Angeles and State of California, have invented new and useful Improvements in Processes of Producing Colored Moving-Picture Films, of which the following is a specification.

My invention relates to the art of preparing colored cinematographic films, and particularly to films made ready for exhibition, and covers the process of making the same.

Various methods have been proposed for producing cinematographic films, which when projected on the screen will reproduce the natural colors of the objects of which the negative was taken. The usual processes involve either an enormous amount of manual labor in tinting and coloring the film, or the film, when projected on the screen, produces defective results in that the successive pictures either fail to register exactly, causing an indistinct and blurred outline of the figures, or the colors of the objects do not represent those in nature. This is especially true in the case of rapidly moving objects where the negative was taken by a two-color screen process.

It is an object of this invention to devise a process, whereby the natural colors of the objects photographed will be faithfully reproduced and the sharp and distinct outlines of the objects will be preserved.

It is another object of this invention to devise a process dispensing with the expensive manual labor of the coloring or tinting the positive films, and whereby the films will absorb in a suitable dye bath the natural colors of the objects photographed.

My invention consists in the steps of the process hereinafter described and claimed.

In the accompanying drawings which form a part of this specification, I have illustrated an apparatus suitable for carrying on my process.

Figures 1 to 4 inclusive, illustrate fragmentary portions of the films and corresponding portions of the negatives.

Fig. 5 is a diagrammatic view showing the apparatus used for the travel of the films therethrough in making the transfer of coloring matter to the positive film, representing the final product.

Although it is apparent that my process is applicable to the use of three color filters, practically all the natural tints may be produced by the use of a panchromatic film and two color filters, orange red and blue green. Therefore the following description will be limited to the latter.

By the use of a panchromatic film, that is a film substantially equally sensitive to all colors, all the objects in a picture will be impressed upon the negative film with the photographic values in proportion to their color values. The orange red color filter will pass all colors from deep red to yellow in proper proportion, while the blue green filter will likewise pass all colors from yellow to blue.

In the drawings the various parts of the image have been shown in solid black and white to indicate the positive and negative relation broadly, and in doing this, and for the sake of clearness, the background in both the positive and negative views has been shown white. The different tone values of the two prints A and B have been designated by the numerals qualified by the letters $a$ and $b$.

I take the positive shown in Fig. 2 consisting of the views A only and put the same in a green dye tone bath, which will dye the silver image in proportion to the silver oxid on the film, said silver oxid portions being colored green, while the light portion as the flower $25^a$ is unaffected by the bath. I prefer to convert the silver on the film into a silver iodid or silver ferricyanid, which acts as a mordant for the green dye and also for the red transferred dye to be deposited on this film, as will be presently described.

I take the negative shown in Fig. 4, and consisting of the negative views B shown in Fig. 1, and exactly identical therewith, except that the views B in Fig. 4 are arranged consecutively, while on the negative shown in Fig. 1, the same are arranged alternately with views A, and develop the same. As well known in photography, the sensitive material in the film which is not acted upon by the light, is removed in the hypo bath, leaving only gelatinous matter thereon, which is transparent. The negative is then immersed in a chemical solution which fixes and solidifies the exposed or developed portions of the views, rendering such portions impervious to liquid, but does not affect the viscous consistency of the transparent portions, in the present instance, the flower $25^b$. The negative after going through the fixing bath is allowed to dry, then it is immersed in a suitable red dye and allowed to remain until a quantity of the red dye such as anilin has thoroughly penetrated and adhered to the viscous surface of the gelatinous portions, in the present instance 25$^b$. It is then allowed to dry, when it is ready for the transferring process.

In the present process, the negative film shown in Fig. 4 is used as a support for the coloring matter to be transferred on the positive shown in Fig. 2, for two reasons: first, because it discloses thereon an exact replica of that image in the positive film it is desired to color, and can be readily treated as above described, and second, because a negative film and positive film may be placed together, face to face, with their gelatinous surfaces in contact and with the views on each in perfect register with each other.

Referring now more particularly to Fig. 5, of the drawings, let BB designate a negative film, which has been treated as above described, and AA a positive film to be colored. The negative BB is placed upon a suitable reel 29, facing outwardly thereon as indicated; it is then threaded over a series of adjustably retardable rollers 30 and 31, each equipped with peripheral teeth for engaging the perforations of the films, under a rubber pressure roller 32, and around underneath a drum 33, also provided with teeth upon its periphery for engaging the perforations of the films, leaving the apparatus over a roller 34, thence to a drying reel 35. The positive film AA is placed upon a reel 36 adjacent a receptacle containing a chemical solution through which it is run for the purpose of moistening and softening the gelatinous coating thereon, sufficient to dissolve and absorb coloring matter from the negative film upon being subjected to a pressurable contact therewith, as will be hereinafter explained.

From reel 36 the positive film AA is successively carried over rollers 37, 38, 39 and 39', in the direction indicated by the arrows, the film being immersed in the solution 40 in passing around rollers 38, between rollers 37 and 39. From roller 39' it is brought into the contact apparatus C over a series of adjustably retardable rollers 41 and 42, similar to rollers 30 and 31, and likewise provided with peripheral teeth for engaging the perforations of the film, under rubber pressure roller 32, around underneath toothed drum 33, leaving the machine over roller 43, from which it may be carried to a drying reel or to another set of apparatus (not shown) should it be desired to subsequently apply one or more other colors.

In passing the two films over drum 33 they are carefully placed in register; that is, like views opposite each other with their gelatinous surfaces in contact.

Revolving drum 33 in the direction indicated by the arrow, by any suitable means, such as a crank 44 and drive shaft 45 actuating a worm and worm wheel secured thereto, draws the films BB and AA over rollers 30 and 31, and 41 and 42, respectively, as indicated by the arrows in Fig. 5.

It seldom happens that two films shrink the same after being wet in the developing process, and therefore it is necessary to stretch either one or the other to bring them into perfect contactual register for the transfer of the coloring matter. This is accomplished by drawing the films over retardable toothed rollers 30, 31, 41 and 42, by revolving the drum 33, either set of rollers being adjusted to exert a pull upon the film to stretch it the desired amount. It very often happens that a film, such as the positive film AA in this case, stretches upon being wet, in which event rollers 30 and 31 may be adjusted to stretch the negative film BB, as above described, to bring it into register therewith.

Immediately after coming into contact with each other upon the periphery of the drum 33, the films BB and AA are subjected to an initial contactual pressure by a soft rubber roller 32; this tends to a more perfect contact which is maintained throughout the travel of the films upon the drum.

In the absorption of coloring matter by the positive film from the negative through contact therewith, various lengths of time are required, varying from at least one-half minute to one minute for best results; and for this reason drum 33 is adapted to revolve slowly to allow the films to remain in contact the required length of time in traveling between rollers 32 and 43.

This process is adapted to the application of one or more colors to a positive film by subjecting it to a pressurable contact with several negative films, each being a facsimile of the said positive and each carrying a different color. To accomplish this several sets of the described apparatus may be set side by side in alinement with each other, and the several negatives carrying the various colors placed on reels and threaded through the machines as above described. The positive film may be carried continuously from one machine to the other and operated as hereinbefore set forth.

The three primary colors, red, yellow and blue, are the ones most commonly used in the process, as it is with these that the greatest variety of natural tints may be produced. For instance, if it is desired to color the shrubbery in the views green, the positive film is run through two machines successively, each carrying a negative film; one with a coating of blue coloring matter and the other a coating of yellow, both upon corresponding portions of their views, and the two colors thus laid one upon the other, producing green. It can be readily seen that in this manner any number of colors may be applied to the various images in the views upon a positive film, by subjecting it to a contact with several negatives carrying the coloring matter.

By this process the coloring matter is evenly applied to the positive film, the outlines being clear and distinct, and the whole accomplished with a minimum of time and expense.

Various changes in the construction and arrangement of the apparatus and in the steps of the process may suggest themselves to those skilled in the art without departing from the spirit of my invention as claimed.

In place of using one film on which the two views A and B are taken simultaneously in pairs for each single operation of the shutter, I may use two films running parallel to one another, one film taking the views A only, and the other film taking the views B only.

The advantage of using two films, over the single film, is this: that the two films may be provided with sensitive coatings, especially adapted for the color screen, with which it is to be used, and dispensing with the panchromatic film altogether as explained in the specification. The light rays passing through the red color screen has the same actinic energy as those passing through the different color filters, may be compensated and equalized, thus enabling the operator to cut down the time of exposure. In this manner also, the density of the color filter may be reduced to a minimum.

I claim:

1. A process of making colored moving picture films which consists of taking a smooth negative, applying transfer dye to the negative, taking a smooth positive of the negative, softening the coating of the positive, placing the positive and negative together face to face, and applying yielding pressure to transfer the dye from the negative to the positive.

2. A process of making colored moving picture films which consists of taking a smooth negative, applying transfer dye to the negative, taking a smooth positive of the negative, softening the coating of the positive, dye-toning the positive, placing the positive and negative together face to face, and applying yielding pressure to transfer the dye from the negative to the positive.

In testimony whereof I have signed my name to this specification.

MAX HANDSCHIEGL.